UNITED STATES PATENT OFFICE.

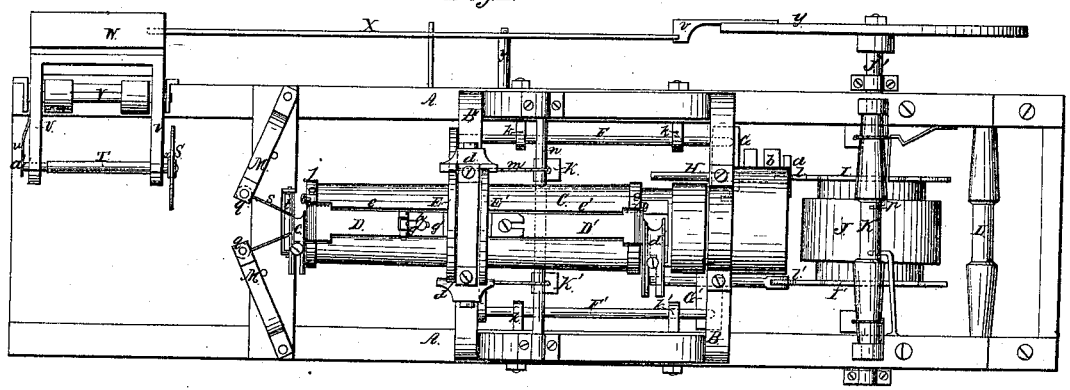
L. Wentworth,
Gage Lathe.
Nº 12,224.
Patented Jan. 9, 1855.

LUTHER WENTWORTH, OF BURLINGTON, IOWA.

LATHE FOR TURNING FANCY HANDLES, &c.

Specification of Letters Patent No. 12,224, dated January 9, 1855.

*To all whom it may concern:*

Be it known that I, LUTHER WENTWORTH, of Burlington, in the county of Des Moines and State of Iowa, have invented certain new and useful Improvements in Lathes for Turning Fancy Handle, Chair-Legs, and other Articles; and I do hereby declare that the following is a full, clear, and exact description of the same, reference being had to the accompanying drawings, forming part of this specification, in which—

Figure 1, is a plan of a lathe constructed according to my invention. Fig. 2, is a longitudinal vertical section through the center. Fig. 3, is a transverse section.

Similar letters of reference indicate corresponding parts in the several figures.

In the lathe which forms the subject of this invention, the stick being turned, does not revolve, but is moved longitudinally toward and through a revolving hollow mandrel which carries the cutters to reduce it to the proper size and shape.

My invention consists, firstly, in a certain arrangement of cutters to be thrown in and out of operation for the purpose of turning moldings, or otherwise turning the stick at intervals, as may be desired; and secondly, in a certain mode of applying and operating a saw near one end of the mandrel, for the purpose of cutting off the handles, or other articles from the stick, as they severally emerge from the mandrel in a finished state.

To enable those skilled in the art to make and use my invention, I will proceed to describe its construction and operation.

A, is the lathe bed, which may be of the usual form. A part only of the bed is represented, the remainder, which may be continued to any length from the left hand of Figs. 1 and 2, being broken away.

B, is the mandrel head, and C, the hollow mandrel, carrying the fixed cutters, (a, b), at the entrance, or right hand end, for reducing the stick to the required size, and the movable cutters (c, d), which are for turning moldings on the ends and different parts of the length of the article. The movable cutter (c) is attached to an arm, D, which is attached to a collar, E, which is capable of sliding lengthwise on the mandrel, but is prevented from turning thereon by V shaped guide pieces, (d, d), secured to the mandrel head, and fitting to grooves in the collar. This arm, D, is fitted to a groove (e) in the mandrel, and is attached to the collar E, in such a way as to be capable of sliding with it lengthwise on the mandrel, and at the same time to turn with the mandrel, by means of two angle plates (g, g′), one of which (g) is sunk in the groove (e) to fit within the collar. Both of these plates have lips fitting up to opposite sides of the collar, and they are secured together, by a screw, (h). The arm, D, is hinged to the plate (g) so as to allow the cutter (c) to move toward, and from the center of the mandrel; and in order that this movement toward and from the center of the mandrel may be produced by the movement of the collar lengthwise upon the mandrel, as indicated by the changes of position of the parts represented in Fig. 2, a portion of the arm near the cutter is inclined to form an angle of about 45° with the other part, and in one or both sides of this inclined part, is a groove (i) to receive the end of a pin (j) which is inserted in the mandrel, to enter the said groove, to direct the movement of the cutter obliquely in and out. The collar, E, has attached to it, a rod, F, which runs longitudinally below the mandrel head in guides (k, k′) attached to the lathe bed; and carries a block, G, in which is secured a second rod, H, which carries at one extremity, a roller (l) which works in contact with the periphery of a cam, I, secured to the lower feed roller, J, which feeds the stick to the mandrel. The roller (l) is always kept in contact with this cam, by means of a weight, K, suspended from a cord or chain, (m) which is attached to the collar, E, and passes over a roller (n) which works in fixed bearings on the lathe bed. The roller, J, is of a circumference exactly equal to the length of the stick to be turned, so as to make one revolution in moving the stick the length of one of the articles to be turned, and therefore by giving a proper form to the cam, I, the collar, E, may be caused to move along the mandrel, to throw the tool (c) into, or out of operation upon the stick, in such manner as to produce a number of articles of similar profile form. The movable cutter, (d') is attached to an arm, (D'), which works in a groove (e') on the mandrel, and is attached to a collar, E', similar to E, in the same manner as, D', is attached to, E, except that the hinge is dispensed with, by leaving play enough in the attachment of the arm to the collar, to allow of the necessary vibration. The collar, E' has attached to it, a rod, F', which runs longitudinally below the mandrel head in guides (k, k) on the opposite side to, F, and carries a block, G', in which is secured a rod, H', carrying a roller (l') which is held in contact with a cam, I' on the opposite side of the roller, J, to the cam, I, by means of a weight K', arranged like K. The cutter, (d') has the same movement as that of (c) except that it is thrown toward the center of the mandrel, and into operation, by the movement of the roller (l') toward the center of the cam, I', while (c) is similarly operated by a movement of the roller (l) from the center of the cam, I.

The stuff to be turned is cut into sticks of exactly a proper length to make one, two, three or more handles, or articles, and these sticks are fed in by hand, closely following one another, between the feed rolls, J, K, L, which conduct them straight toward, and into the mandrel. They are guided laterally by a rigid guide (o) and an elastic guide (p) attached to the lathe bed. The mandrel receives rotary motion through any convenient means, and the articles are reduced to a cylindrical form, by the action of the cutters (a, b) and afterward molded or grooved at regular or irregular intervals, or caused to receive an irregular profile by the cutters (c) and (d) acting as hereinabove described. As the sticks leave the mandrel at the left hand end, they are seized between two rollers (q, q) which are hung in swinging gates, M, M, and drawn toward each other by a weight, N, attached to the said gates by a cord (s) or chain, passing over a roller (t). This roller carries the stick on toward the rotary saw, S, which cuts off the finished articles.

The rotary saw, S, for cutting the finished articles from the stick as they emerge from the hollow mandrel, is arranged at a short distance to the left of the rollers, (q, q). The spindle, T, of this saw is hung in a gate, U, which swings from a shaft V, which is hung parallel with the mandrel in fixed bearings (u, u) on the lathe bed. This gate is weighted at, W, on the opposite side of the shaft, V, to where the saw is placed, for the purpose of throwing the saw up to such a position, (represented in Fig. 3,) that unless the weighted end of the gate be lifted by some means, it cannot come in contact with the stick. The saw receives constant rotary motion by a suitable arrangement of belts not necessary to be described. At the proper time for it to come into operation the weighted end of the saw gate is tilted or lifted by means of a wiper (v) attached to a wheel, Y, on the main shaft, J', of the feed roller, J, which just as the point where the cut is to be made arrives opposite the saw, throws down the right hand end of a lever, X, which works on a fulcrum (y) outside the frame, and throws up the other end of the lever, which supports the weighted end of the gate, and by thus lifting the said weighted end throws down the saw into operation on the stick. Though the saw performs its duty very quickly, and the wiper soon passes the lever, and allows the weighted end of the gate to descend and raise the saw, it is necessary, owing to the continued longitudinal movement of the stick, to provide for the movement of the saw along with it, and for this purpose the saw spindle is allowed a certain extent of longitudinal movement, and for this purpose its journals (x, x') are made longer than their bearings, and a spring (w) is attached to the gate, to act against one end of the spindle to drive it in a contrary direction to the direction of the longitudinal movement of the stick while the saw is in operation, and thus allow the latter, to move with the former, but as soon as the saw is raised clear of the stick, after having done its duty, it is returned by the spring to the position shown in Figs. 1 and 2.

Having thus fully described my invention, I will proceed to state what I claim, and desire to secure by Letters Patent.

1. I do not claim the revolving mandrel, carrying cutters, to revolve around the work while the cutter is stationary. But I claim the within described mode of arranging and operating the cutters (c) and (d) that is to say, attaching them to arms, D, and, D', which revolve with the mandrel, and are attached to collars, E, and E', which are allowed to slide upon the mandrel but not permitted to turn with it, and so guiding the said arms by the inclined slots (i) and studs (j) or their equivalents, that the sliding movement of the collars upon the mandrel, produced by cams I, I', or pattern wheels, will move the cutters to and from the center of the work for the purpose of turning moldings or grooves, at intervals or giving an irregular profile to the article being turned, as herein fully set forth.

2. I do not claim hanging a rotary saw in a swinging gate, nor allowing the saw spindle a longitudinal movement, under the control of a spring, but I claim a saw, S, arranged as described upon the lathe in a swinging gate, U, which is weighted at, W, opposite the saw, to throw the saw to an inoperative position, but which is tilted to throw the saw into operation at the proper time to cut off the finished articles from the stick, by means of a lever, X, actuated by a wiper (v) on a wheel, Y, which is attached to one of the feed rolls, or otherwise so driven as to make one revolution, while the stick moves the length of one of the articles to be turned, as herein set forth.

LUTHER WENTWORTH.

Witnesses:
WILLIAM H. STARR,
E. D. JAGGAR.